US007710492B2

(12) United States Patent
Ito

(10) Patent No.: US 7,710,492 B2
(45) Date of Patent: May 4, 2010

(54) IMAGING DEVICE AND IMAGING METHOD FOR PERFORMING AUTOMATIC FOCUS DETECTION

(75) Inventor: Kei Ito, Machida (JP)

(73) Assignee: Ricoh Company, Ltd., Tokyo (JP)

( * ) Notice: Subject to any disclaimer, the term of this patent is extended or adjusted under 35 U.S.C. 154(b) by 190 days.

(21) Appl. No.: 11/819,289

(22) Filed: Jun. 26, 2007

(65) Prior Publication Data
US 2008/0225158 A1 Sep. 18, 2008

(30) Foreign Application Priority Data
Jun. 27, 2006 (JP) .............................. 2006-176640

(51) Int. Cl.
*G03B 13/00* (2006.01)
*H04N 5/232* (2006.01)
(52) U.S. Cl. ..................... 348/345; 348/222.1; 348/362
(58) Field of Classification Search .............. 348/222.1, 348/234–236, 345, 362, 366
See application file for complete search history.

(56) References Cited
U.S. PATENT DOCUMENTS

| 6,657,668 | B1 | 12/2003 | Hata |
| 6,771,315 | B1* | 8/2004 | Nanjo et al. ................. 348/362 |
| 2002/0012064 | A1* | 1/2002 | Yamaguchi .................. 348/362 |
| 2004/0027479 | A1* | 2/2004 | Ikeda ......................... 348/363 |
| 2004/0036795 | A1* | 2/2004 | Fujii et al. ................... 348/349 |
| 2004/0252224 | A1 | 12/2004 | Shiraishi et al. |
| 2005/0185946 | A1 | 8/2005 | Sugiura et al. |
| 2007/0024879 | A1* | 2/2007 | Hamilton et al. ............. 358/1.9 |

FOREIGN PATENT DOCUMENTS

| JP | 39-5265 | 4/1997 |
| JP | 11-215426 | 7/1999 |
| JP | 2003-230039 | 8/2003 |
| JP | 2003-289467 | 10/2003 |
| JP | 2005-140995 | 6/2005 |
| JP | 2005-227750 | 8/2005 |
| JP | 2006-243101 | 9/2006 |
| JP | 2006-349908 | 12/2006 |

* cited by examiner

*Primary Examiner*—Gevell Selby
(74) *Attorney, Agent, or Firm*—Dickstein Shapiro LLP

(57) ABSTRACT

An imaging device having an imaging element which takes a subject image by light from a subject passing through a photographing lens and obtains an image data, includes a filter selection device configured to select a filter transmitting an optional frequency component of the subject image; an autofocus detection device configured to detect a focus from an image data obtained by moving a focus lens to a lens position; and an acquisition timing setting device configured to set a timing of capturing the image data, the imaging device being configured to use the acquisition timing setting device in accordance with a photographing condition, and change the filter of the filter selection device in accordance with the acquisition timing set by the acquisition timing setting device.

16 Claims, 7 Drawing Sheets

$$\begin{pmatrix} \text{FIRST FILTER : (41)} \\ \text{SECOND FILTER : (42)} \\ \text{THIRD FILTER (43) : (41)} \times \text{(42)} \end{pmatrix}$$

IMAGING DEVICE AND IMAGING METHOD FOR PERFORMING AUTOMATIC FOCUS DETECTION

BACKGROUND OF THE INVENTION

1. Field of the Invention

The present invention relates to an imaging device and an imaging method using the imaging device. In particular, this invention relates to an imaging device which is configured to perform automatic focus detection in accordance with a brightness of a subject, and to an imaging method using the imaging device.

2. Description of the Related Art

Generally, an automatic focus (AF) device that automatically focuses on a subject is installed in an electronic imaging device such as a digital still camera. Conventionally, as a control method of an AF device, a so-called "hill climbing AF control" is known, for example, in JP S39-5265 B.

Hereinafter, this hill climbing AF control method is explained simply.

This method is used to acquire an integration value of high frequency components or brightness differences in adjacent pixels, from image signals obtained per one field or one frame, and determine the integration value of the brightness differences as an AF evaluation value which represents a focusing level. In this method, when a photographing lens is in an in-focus state, the AF evaluation value increases because an edge part of the subject is clear, and the AF evaluation value becomes small when the photographing lens is out of focus. When AF operation is carried out, while moving the photographing lens, the AF evaluation value is obtained sequentially, and at the position where the AF evaluation value becomes largest, i.e. a peak position which is regarded as a focus point, the photographing lens is stopped.

Meanwhile, in a device which images a still image, such as a digital still camera, accurate focusing is generally required, compared to a device which photographs a moving image such as a video camera; therefore, AF operations are carried out per photographing operation, and in recording mode focusing operations are always repeatedly carried out.

However, when the brightness is low, or when a subject having low contrast is photographed, a top of the peak of the AF evaluation value becomes low, or noise is generated in the AF evaluation value data due to the low contrast and thus a plurality of tops of the peak appear; therefore, a problem arises in that an excellent in-focus state can not be obtained.

In response to the conventional problems, for example, JP 2003-230039A proposes a method that outputs a brightness data in accordance with a digital image data as an automatic exposure (AE) evaluation value, and when the AE evaluation value is smaller than a certain predetermined value, i.e. when the subject is dark, enlarges an area where an AF evaluation value is acquired to carry out an AF control.

However, for the method disclosed in JP 2003-230039A, a problem arises in that if the area where the AF evaluation value is acquired is improperly enlarged, a photographing background is influenced, and thus the focusing is not carried out on the subject that the photographer intended, but for example on the background.

Moreover, JP 2003-289467A proposes a method which makes it possible to carry out an accurate focusing without the influence of brightness of an image, by making a histogram from a brightness signal of the image, setting a gamma table based on the histogram, and performing a gamma correction.

However, in this method, a plurality of the gamma tables suitable for the environment should be prepared, and the processing operation becomes complicated, so that a demand for a method with which it is possible to carry out the focusing accurately with fewer gamma tables has increased.

In addition, though contrast increases by the gamma correction, it is understood that a black stretch occurs in a subject when the brightness is low; therefore, a method in which the gamma correction is not carried out when the brightness is low is considered to be more preferable.

SUMMARY OF THE INVENTION

In light of the above, the present invention proposes, for example, an imaging device which changes an acquisition timing of an AF evaluation value responding to the environment of imaging, in particular at a low brightness, and further during changing, makes a filter when obtaining the AF evaluation value variable, and carries out an AF widely from a high brightness to a low brightness. The present invention proposes an imaging method using this imaging device as well.

According to an aspect of the present invention, an imaging device including an imaging element which takes a subject image by light from a subject passing through a photographing lens and obtains an image data, includes a filter selection device configured to select a filter transmitting an optional frequency component of the subject image; an autofocus detection device configured to detect a focus from an image data obtained by moving a focus lens to a lens position; and an acquisition timing setting device configured to set a timing of capturing the image data, the imaging device being configured to use the acquisition timing setting device in accordance with a photographing condition, and change the filter of the filter selection device in accordance with the acquisition timing set by the acquisition timing setting device.

According to another aspect of the present invention, an imaging device including an imaging element which takes a subject image by light from a subject passing through a photographing lens and obtains an image data, includes a filter selection device configured to select a filter transmitting an optional frequency component of the subject image; an autofocus detection device configured to detect a focus from an image data obtained by moving a focus lens to a lens position; an acquisition timing setting device configured to set a timing of capturing the image data; and a photometric device configured to measure a brightness of the subject, the imaging device being configured to use the acquisition timing setting device in accordance with a measured result obtained by the photometric device, and change the filter of the filter selection device in accordance with the acquisition timing set by the acquisition timing setting device.

According to a preferable embodiment of the present invention, the imaging device further includes a detection result judgment device configured to judge whether a focus detection is possible or not according to a detection result by the autofocus detection device; and an acquisition timing setting device capable of setting an acquisition timing of the image data, the imaging device being configured to use the acquisition timing setting device in accordance with the photographing condition, and change a threshold of the detection result judgment device in accordance with a setting status of the acquisition timing setting device.

According to another preferable embodiment of the present invention, as the acquisition timing set by the acquisition timing setting device, at least either after digital clamp or after gamma correction is selectable.

According to a further preferable embodiment of the present invention, after digital clamp is set by the acquisition timing setting device, the filter of the filter selection device is changed to a filter only transmitting lower frequency.

According to a further preferable embodiment of the present invention, after gamma correction is set by the acquisition timing setting device, the filter of the filter selection device is changed to a filter transmitting higher frequency.

According to a further preferable embodiment of the present invention, after digital clamp is set by the acquisition timing setting device, the threshold of the detection result judgment device is reduced.

According to a further preferable embodiment of the present invention, after gamma correction is set by the acquisition timing setting device, the threshold of the detection result judgment device is increased.

According to a further aspect of the present invention, an imaging method in which an imaging element takes a subject image by light from a subject passing through a photographing lens and obtains an image data, includes: a filter selection step for selecting a filter transmitting an optional frequency component of the subject image; an autofocus detection step for detecting a focus from an image data obtained by moving a focus lens to a lens position; and an acquisition timing setting step for setting a timing of capturing the image data, the acquisition timing setting step being used in accordance with a photographing condition, and the filter of the filter selection step being changed in accordance with the acquisition timing set by the acquisition timing setting step.

According to a further aspect of the present invention, an imaging method in which an imaging element takes a subject image by light from a subject passing through a photographing lens and obtains an image data, includes: a filter selection step for selecting a filter transmitting an optional frequency component of the subject image; an autofocus detection step for detecting a focus from an image data obtained by moving a focus lens to a lens position; an acquisition timing setting step capable of setting a timing of capturing the image data; and a photometric step for measuring a brightness of the subject, the acquisition timing setting step being used in accordance with a measuring result obtained by the photometric step, and the filter of the filter selection step being changed in accordance with the acquisition timing set by the acquisition timing setting step.

According to a preferable embodiment of the present invention, the imaging method further includes a detection result judgment step for judging whether a focus detection is possible or not according to a detection result by the autofocus detection step; and an acquisition timing setting step capable of setting an acquisition timing of the image data, the acquisition timing setting step being used in accordance with the photographing condition, and a threshold of the detection result judgment step being changed in accordance with a setting status of the acquisition timing setting step.

According to a further preferable embodiment of the present invention, the acquisition timing set by the acquisition timing setting step is selectable at least from either after digital clamp or after gamma correction.

According to a further preferable embodiment of the present invention, after digital clamp is set by the acquisition timing setting step, the filter of the filter selection step is changed to a filter only transmitting lower frequency.

According to a further preferable embodiment of the present invention, after gamma correction is set by the acquisition timing setting step, the filter of the filter selection step is changed to a filter transmitting higher frequency.

According to a further preferable embodiment of the present invention, after digital clamp is set by the acquisition timing setting step, the threshold of the detection result judgment step is reduced.

According to a further preferable embodiment of the present invention, after gamma correction is set by the acquisition timing setting step, the threshold of the detection result judgment step is increased.

BRIEF DESCRIPTION OF THE DRAWINGS

The invention will be described further below with reference to embodiments and the accompanying schematic drawings, in which.

DETAILED DESCRIPTION OF THE PREFERRED EMBODIMENTS

Figure 1A:
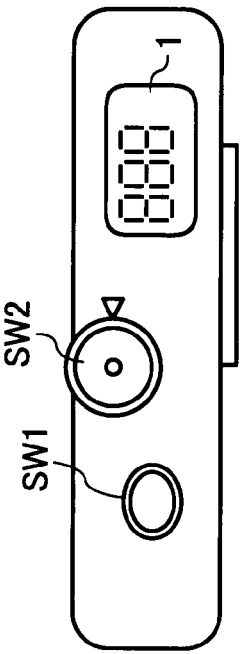
FIG. 1A is a view of a digital camera viewed from above according to an embodiment of the invention.
Figure 1B:
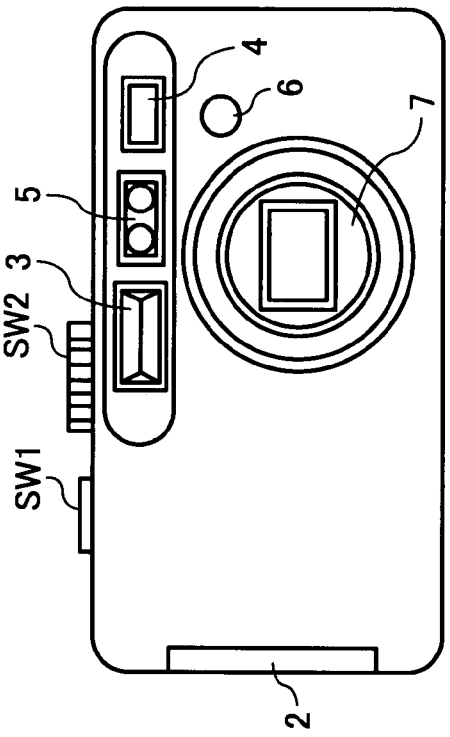
FIG. 1B is a view of a digital camera viewed from a front side according to an embodiment of the invention.
Figure 1C:
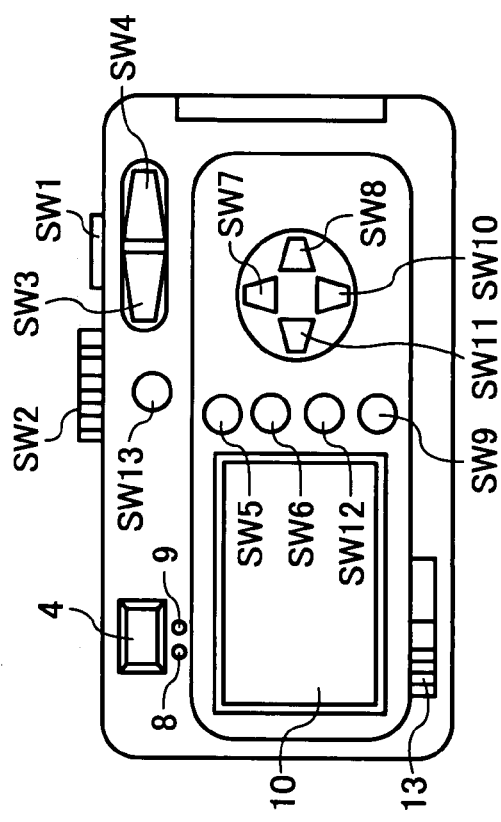
FIG. 1C is a view of a digital camera viewed from a back-side according to an embodiment of the invention.

FIGS. 1A, 1B and 1C illustrate a schematic view of a digital still camera of an example of an imaging device according to the present invention.

As illustrated in FIG. 1A, a release shutter SW1, a mode dial SW2 and a sub liquid crystal display (LCD) 1 are arranged on a top surface of the digital camera.

As illustrated in FIG. 1B, a lens barrel unit 7 including a photographing lens, an optical viewfinder 4, a strobe light section 3, a distance measurement unit 5, a remote control light receiving section 6, and a lid 2 of a memory card material well and a battery material well are arranged on a front side of the digital camera.

As illustrated in FIG. 1C, a power supply switch 13, a LCD monitor 10, a LED8 for AF, a strobe LED9, the optical viewfinder 4, a zoom switch SW3 for wide-angle direction, a zoom switch SW4 for telephoto direction, a setting and canceling switch SW5 of a self-timer, a menu switch SW6, an upward movement and strobe set switch SW7, a rightward movement switch SW8, a display switch SW9, a downward movement and macro switch SW10, a leftward movement and image confirmation switch SW11, an OK switch SW12, and a quick access switch SW13 are arranged on a back side of the digital camera.

Next, an inner system structure of the digital camera will be explained.

Figure 2:
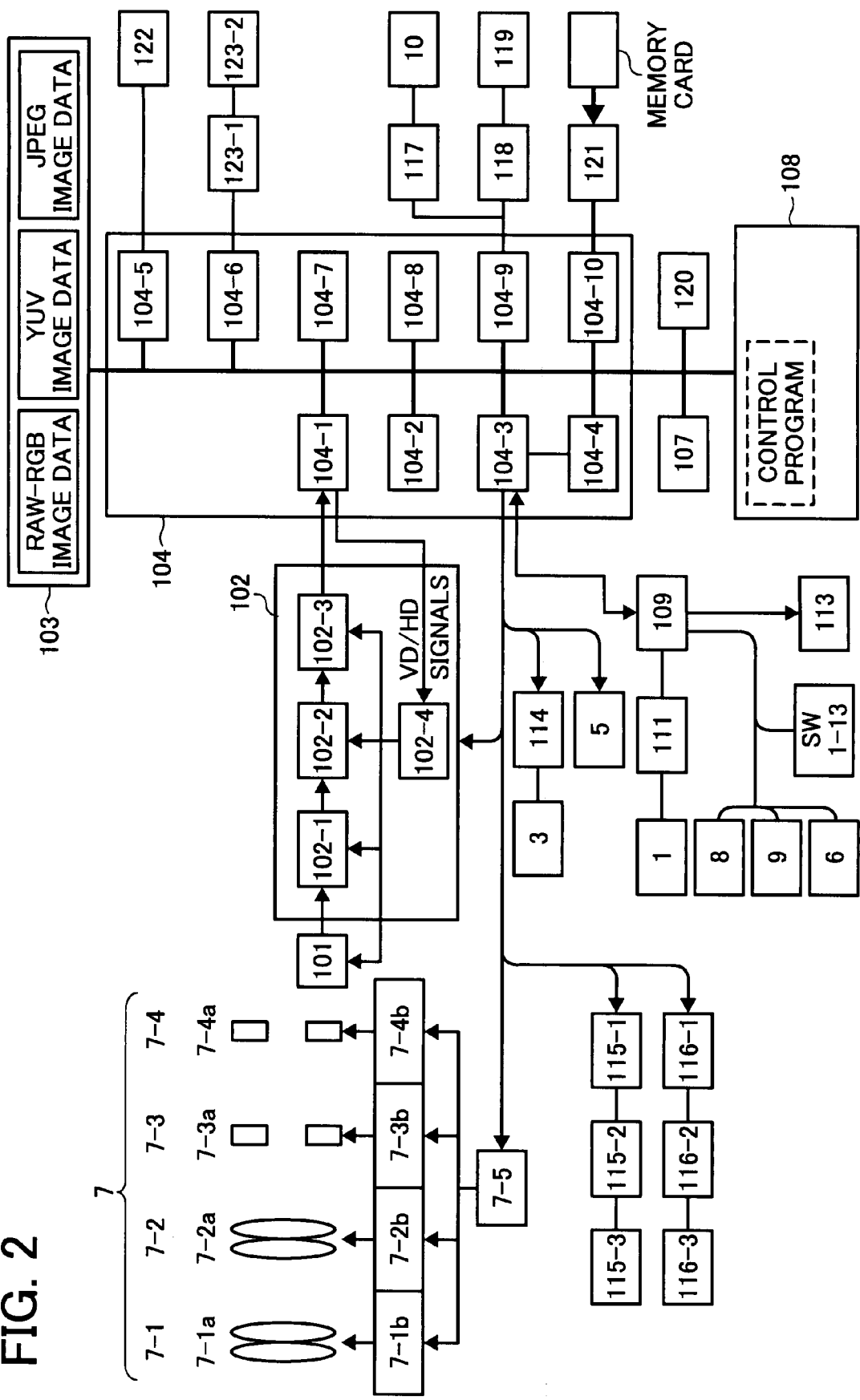
FIG. 2 is a block view illustrating an example of an inner system structure of the digital camera according to an embodiment of the invention.

As illustrated in FIG. 2, each part of the digital still camera is configured to be controlled by a digital still camera processor 104 (processor 104).

The processor 104 has a CCD1 signal processing block (104-1), a CCD2 signal processing block (104-2), a CPU block (104-3), a local SRAM(104-4), a USB block (104-5), a serial block (104-6), a JPEG-CODEC block (104-7), a RESIZE block (104-8), a TV signal display block (104-9), and a memory card controller block (104-10), and these are connected by a bus line mutually.

A SDRAM103 which stores RAW-RGB image data, YUV image data and JPEG image data is arranged outside the processor 104, and is connected to the processor 104 by the bus line.

In addition, a RAM107, a built-in memory 120, and a ROM108 in which a control program is stored are arranged outside the processor 104, and these are connected to the processor 104 by the bus line.

The lens barrel unit 7 includes a zoom optical system (7-1) having a zoom lens (7-1a), a focus optical system (7-2) having a focus lens (7-2a), an aperture unit (7-3) having an aperture (7-3a), and a mechanism shutter unit (7-4) having a mechanism shutter (7-4a).

The zoom optical system (7-1), the focus optical system (7-2), the aperture unit (7-3) and the mechanism shutter unit (7-4) are driven by a zoom motor (7-1b), a focus motor (7-2b), an aperture motor (7-3b) and a mechanism shutter motor (7-4b) respectively, and each of these motors is configured such that operation of each of these motors is controlled by a motor driver (7-5) which is controlled by the CPU block (104-3) of the processor 104.

The lens barrel unit 7 has a photographing lens which produces a subject image on an imaging element CCD101, and the CCD101 converts the subject image into image signals and inputs the signals into an F/E-IC102.

The F/E-IC102 has a CDS (102-1), an ADC (102-2), and an A/D conversion section (102-3), and carries out predetermined processes to the image signals individually, converts the signals into digital signals, and inputs the digital signals into the CCD1 signal processing block (104-1) of the processor 104. These signal processing operations are controlled by VD/HD signals output from the CCD1 signal processing block (104-1) of the processor 104, through a TG (102-4).

The CPU block (104-3) of the processor 104 controls a voice recording operation by a voice recording circuit (115-1). The voice recording circuit (115-1) records an amplification signal of a voice signal converted by a microphone (115-3) which is amplified by a microphone amplifier (115-2), according to an instruction.

The CPU block (104-3) controls an operation of a voice reproduction circuit (116-1). The voice reproduction circuit (116-1) is configured to play the voice signal recorded in a suitable memory according to an instruction, input the signal to an audio amplifier (116-2), and then output the voice from a speaker (116-3).

The CPU block (104-3) controls an operation of the strobe circuit 114 to emit illuminating light from the strobe light section 3.

In addition, the CPU block (104-3) controls an operation of the distance measurement unit 5.

The CPU block (104-3) is connected to a sub-CPU109 arranged outside the processor 104, and the sub-CPU109 controls a display by the LCD1 through a LCD driver 111.

The sub-CPU109 is further connected to an operation key unit which has an AFLED8, the strobe LED9, the remote control light receiving section 6 and the switches SW1-SW13, and a buzzer 113.

The USB block (104-5) is connected to a USB connector 122, and the serial block (104-6) is connected to a RS-232C connector (123-2) through a serial driver circuit (123-1).

The TV display block (104-9) is connected to the LCD monitor 10 through a LCD driver 117, and to a video Jack 119 through a video amplifier 118. The memory card controller block (104-10) is connected to a card contact point of a memory card slot 121.

Next, operations of a digital still camera with the above-mentioned structure will be explained. First, general operations of the digital still camera will be explained.

The camera starts in a recording mode when the mode dial SW2 illustrated in FIG. 1 is set to be the recording mode. By the setting of the mode dial SW2, the CPU detects a state of the mode switch included in the operation section illustrated in FIG. 2, being in the state that the recording mode is ON, and the motor driver (7-5) is controlled to move the lens barrel unit 7 to a position capable of photographing. In addition, power supplies of each section of the CCD101, the F/E-IC102 and the LCD display 10 or the like are turned on to start operations. When the power supply of each part is turned on, operations of a viewfinder mode are begun.

In the viewfinder mode, incident light to the imaging element (CCD101) through a lens is converted into electric signals and sent to the CDS circuit (102-1) and the A/D converter (102-3), as R, G, and B of analog signals.

Predetermined signals converted into digital signals in the A/D converter (102-3) are converted into YUV signals in a YUV conversion section in the digital signal processing IC (SDRAM103), and are written in a frame memory by a memory controller. This YUV signals are read by the memory controller, and sent to a TV or the LCD monitor 10 through the TV signal display block (104-9) to be displayed.

This process is performed at 1/30-second intervals, and the display of the viewfinder mode is updated every 1/30-second.

Moreover, based on the digital RGB signal acquired in the CCD-I/F block of the digital signal processing IC (SDRAM103), an AF evaluation value which represents a focusing level of an image plane and an AE evaluation value which represents an exposure state are calculated.

AF evaluation value data is detected by the CCD1 signal processing block (104-1) in the processor 104 of the digital still camera, as a feature data in a certain region space of the CCD101.

The AF evaluation value is generated in the CCD1 signal processing block (104-1).

First, data from the F/E-IC is processed with digital clamp, white balance, and gamma correction, in the CCD1 signal processing block (104-1).

Figure 3:
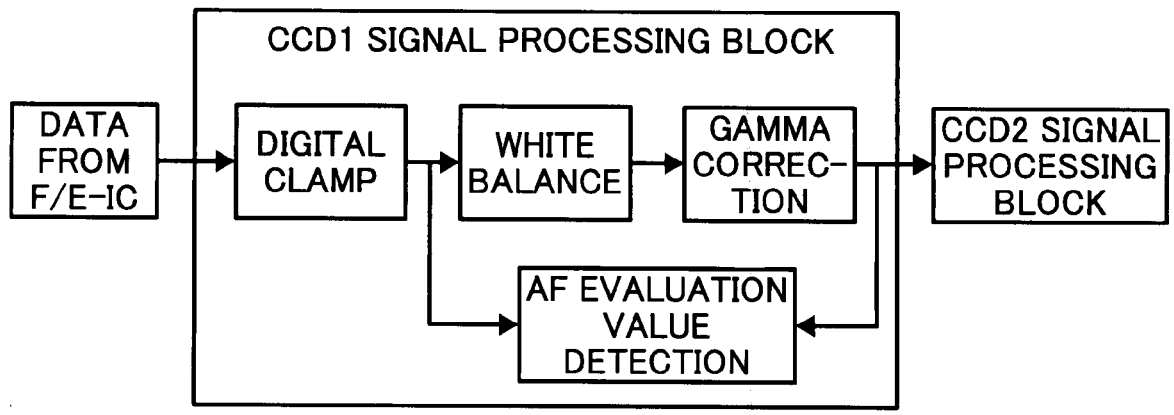
FIG. 3 illustrates processing in a CCD1 signal processing block according to an embodiment of the invention.

The detection of the AF evaluation value is performed either after digital clamp or after gamma correction (FIG. 3).

In this camera, a device is provided to set either after digital clamp or after gamma correction illustrated in FIG. 3, to enable variation of the setting in accordance with the condition.

Here, the gamma correction means to obtain a natural display, perform a color correction and carry out a processing which brings a ratio of changes of a voltage equivalent related to a change of a brightness of an image close to one.

Since contrast of the subject tends to increase by the gamma correction, "after gamma correction" is set as default.

In addition, the AF evaluation value is generated by an output integration value of a frequency component extraction filter or an integration value of a brightness difference of adjacent pixels when. detecting.

Figure 4:
FIG. 4 illustrates a frequency extraction filter according to an embodiment of the invention.
Figure 4:
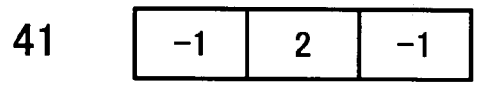

As illustrated in FIG. 4, the frequency component extraction filter includes two types of filters, i.e. a first filter 41 for high frequency and a second filter 42 for low frequency, and it is possible to generate an output integration value of a filter multiplying these filters (a third filter 43 in FIG. 4).

These first filter 41 for high frequency and second filter 42 for low frequency are filters of an image processing station.

The first filter 41 for high frequency is a filter (high-pass filter) which enhances the brightness difference between pixels. The first filter 41 for high frequency multiplies brightness data of the adjacent pixels by coefficients of "−1", "2", and "−1" individually. The second filter 42 for low frequency is a filter (low-pass filter) which makes a correlation of the adjacent pixels gradually and eliminates noise.

The second filter 42 multiplies brightness data of the adjacent pixels by coefficients of "1", "2", and "1" individually.

The third filter 43 is a filter that eliminates noise in the brightness data which is enhanced by the filter 41 for high frequency, by the filter 42 for low frequency. Usually, a filter used when outputting the AF evaluation value data includes a filter such as the first filter 41 for high frequency, or the third filter 43.

The high frequency component becomes highest due to an edge part of the subject being clear when the lens is in focus. With this, AF evaluation values at each of focus lens positions are obtained and a maximum point (peak position) is detected, during the focusing detection operation by AF. Moreover, it is necessary to take it into consideration that there is a plurality of maximum points. When there is a plurality of maximum points, a magnitude of an evaluation value of each of the peak positions, or a decreasing and increasing degree thereof compared with evaluation values of the peak positions of its circumference is judged, and a point with most reliability is judged as a focus position to perform AF.

In addition, in the AE evaluation value, a digital RGB signal is divided into some areas, and brightness data in the area is used.

In this way, for the pixels in each area, pixels each of which exceeds a predetermined threshold are assumed to be object pixels, and their brightness values are added and multiplied by a number of the object pixels. A proper exposure is calculated by the brightness distribution of the each area, and a correction is made in capturing a next frame.

When a button of the release shutter SW1 in FIG. 1 is pressed, a still image photographing start signal is acquired from the CCD101 illustrated in FIG. 2 into the processor 104, through the F/E-IC102. Subsequently, the microcomputer (CPU block 104-3) drives the driving motor (7-2b) of the focus lens (7-2a) in synchronization with a frame rate, through the motor driver (7-5), to perform the hill climbing AF.

When a focusing range is an entire region from infinity to a close position, the focus lens moves from the close position to infinity, or from infinity to the close position, and the microcomputer reads the AF evaluation values in each frame (each focus position) generated by the digital signal processing IC.

A point where the AF evaluation value of each focus position becomes the maximum is regarded as a focus position, and the focus lens (7-2a) is moved to the focus position.

After the above-mentioned AF is completed, an analog RGB signal acquired from the CCD101 is converted into a digital RGB signal, and stored in the SDRAM109 which is the frame memory through the digital signal processing IC.

The digital RGB signal is read into the digital signal processing circuit again, and converted into a YUV data, and then written back in the frame memory.

When photographing the still image, the YUV converted image data is sent to the JPEG CODEC block (104-7) which is an image compression expansion circuit in the digital signal processing IC.

The YUV data sent to the image compression expansion circuit is compressed and written back in the frame memory.

The compression data in the frame memory is read out through the digital signal processing circuit, and stored in a data storage memory, for example, a memory card.

Embodiment

Operations of an embodiment of an imaging device according to the present invention will be explained referring mainly to the flow chart.

Embodiment 1

Figure 5:
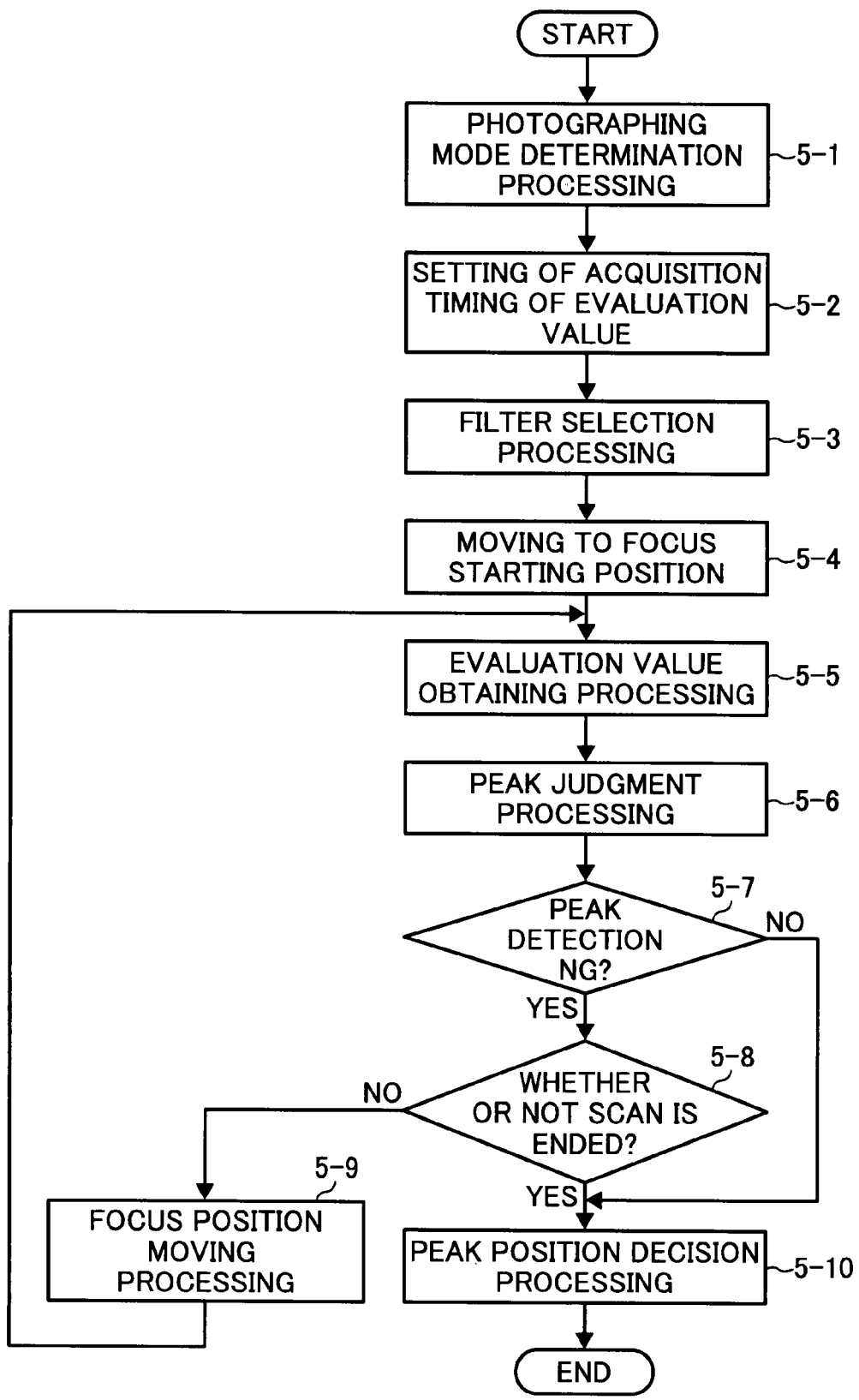
FIG. 5 illustrates an operation flowchart of a first embodiment according to the present invention.

FIG. 5 illustrates a specific operation flow chart of an imaging device according to the first embodiment.

In the imaging device, an imaging element takes a subject image by light from a subject passing through a photographing lens and obtains an image data, the imaging device includes a filter selection device configured to select a filter transmitting an optional frequency component of the subject image; an autofocus detection device configured to detect a focus from an image data obtained by moving a focus lens to a lens position; and an acquisition timing setting device configured to set a timing of capturing the image data, the imaging device is configured to use the acquisition timing setting device in accordance with a photographing condition, and change the filter of the filter selection device in accordance with the acquisition timing set by the acquisition timing setting device.

First, the release shutter button SW1 illustrated in FIG. 1 is operated, and a photographing mode immediately before the release shutter button being pressed is detected (5-1). As the photographing mode, it is possible to detect two modes of (a) usual photographing mode and (b) dark photographing mode, and the modes are able to be switched accordingly by the mode dial SW2 illustrated in FIG. 1.

Figure 6:
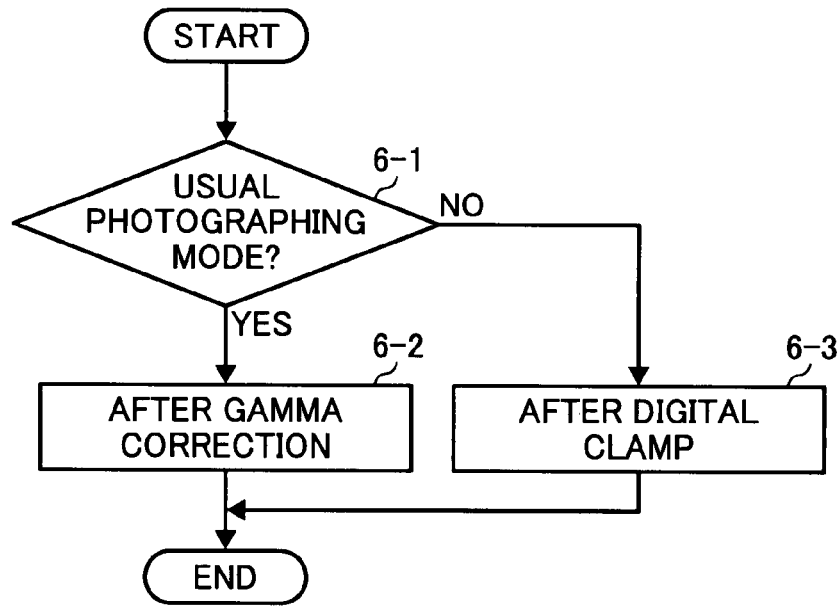
FIG. 6 illustrates a flowchart of an acquisition timing setting process of an evaluated value.

Next, a setting of an acquisition timing of an AF evaluation value is decided according to the detected photographing mode (5-2). FIG. 6 illustrates the acquisition timing setting processing of the evaluation value.

When the photographing mode is (a) usual photographing mode (6-1), the acquisition timing of the evaluation value is decided to be after gamma correction (6-2), and then the process advances to the following processing.

When the photographing mode is (b) dark photographing mode, due to the imaging device often being used for dark, and if the gamma correction is made, there is a risk that a black stretch occurs in a subject, therefore the acquisition timing of the evaluation value is decided to be after digital clamp to prevent black stretch from occurring in the subject (6-3), and then the process advances to the following processing.

Subsequently, the filter selection processing illustrated in FIG. 5 is carried out (5-3).

Figure 7:
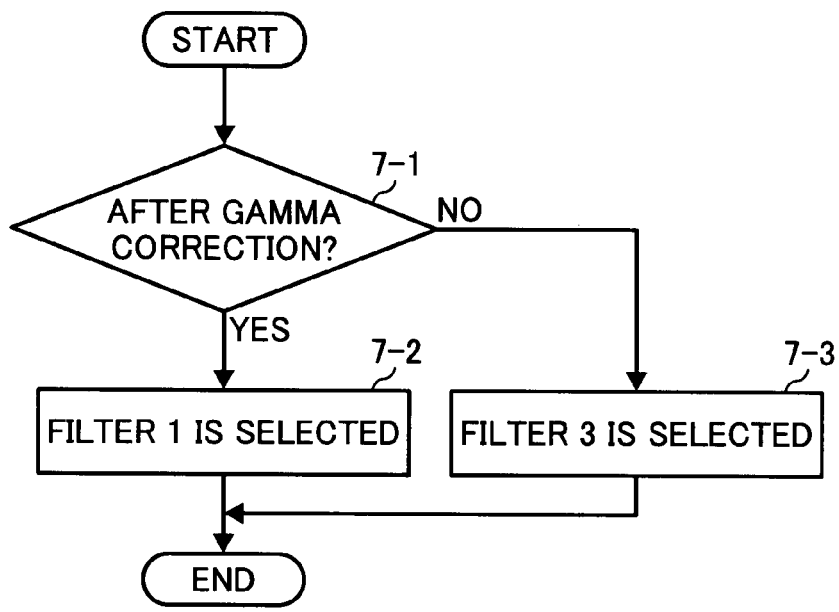
FIG. 7 illustrates a flowchart of a filter selection process by the acquisition timing of the evaluated value.

FIG. 7 illustrates the flow chart of this processing.

When the acquisition timing of the evaluation value is after gamma correction, which is the default (7-1), for the filter, the first filter 41 for high frequency is selected (7-2). When the acquisition timing of the evaluation value is after digital clamp, for the filter, the third filter 43, which multiplies the first filter 41 for high frequency and the second filter 42 for low frequency, is selected (7-3).

In this way, in particularly in the dark photographing mode, the AF evaluation value is acquired after digital clamp in order to prevent black stretch from occurring in the subject due to the gamma correction, and the filter is set to be the second filter 42 for low frequency, so that it is possible to improve AF accuracy even when the brightness is low.

Next, as illustrated in FIG. 5, the focus lens (7-2a) is moved to the focus starting position (5-4), and the AF evaluation value is obtained (5-5).

After obtaining the AF evaluation value, detection of whether the evaluation value is a peak or not, i.e. "Peak detection NG?" (5-7) is judged by a peak judgment processing (5-6). For a threshold used for the peak judgment processing, the process is moved to the peak position decision processing when the peak is detected (5-10). When the peak is not detected, the process is advanced to a judgment step (5-8) in which whether or not a scan is ended before the final end of the focus position is judged, and if the scan is not ended, the scan is continued to the focus position sequentially (5-9), the process returns to the evaluation value acquiring processing step (5-5), and similar processing is carried out repeatedly.

When the scan ends, the process moves to a peak position decision processing (5-10).

Next, a peak position with more reliability is decided from the scanned AF evaluation value, then the focus lens is moved to the decided peak position, and the operation is ended.

In addition, when a peak position with reliability is not found, as AF scan NG, the focus lens is moved to a predetermined focus position, for example, a focus position corresponding to about 2.5 m, and the operation is ended (5-10).

Moreover, in the above-mentioned embodiment, the filter for high frequency, the filter for low frequency and the filter multiplying the two filters, which are simple filters of three coefficients are used. If filters of five or seven coefficients are permissible by the microcomputer (CPU block 104-3), it is desirable to use them.

Moreover, considering that an output of a top of the peak of the AF evaluation value is different due to the setting status of the acquisition timing of the evaluation value and the method of the filter selection, it is desirable that the threshold or the like used for the peak judgment during the peak judgment processing (5-6) be changeable in accordance with the state of the image data output.

Further, in the above-mentioned embodiment, the acquisition timing of the AF evaluation value is selected by two photographing modes; however, this invention is not limited to the above-mentioned embodiment.

For example, relating to a macro mode, since the camera itself might form a shadow when photographing a macro subject, there is a possibility of there being a state of low brightness on a screen. In consideration of this case, it is preferable that in a macro mode, the acquisition timing of the AF evaluation value be after digital clamp to prevent black stretch from occurring in the subject.

Embodiment 2

Figure 8:
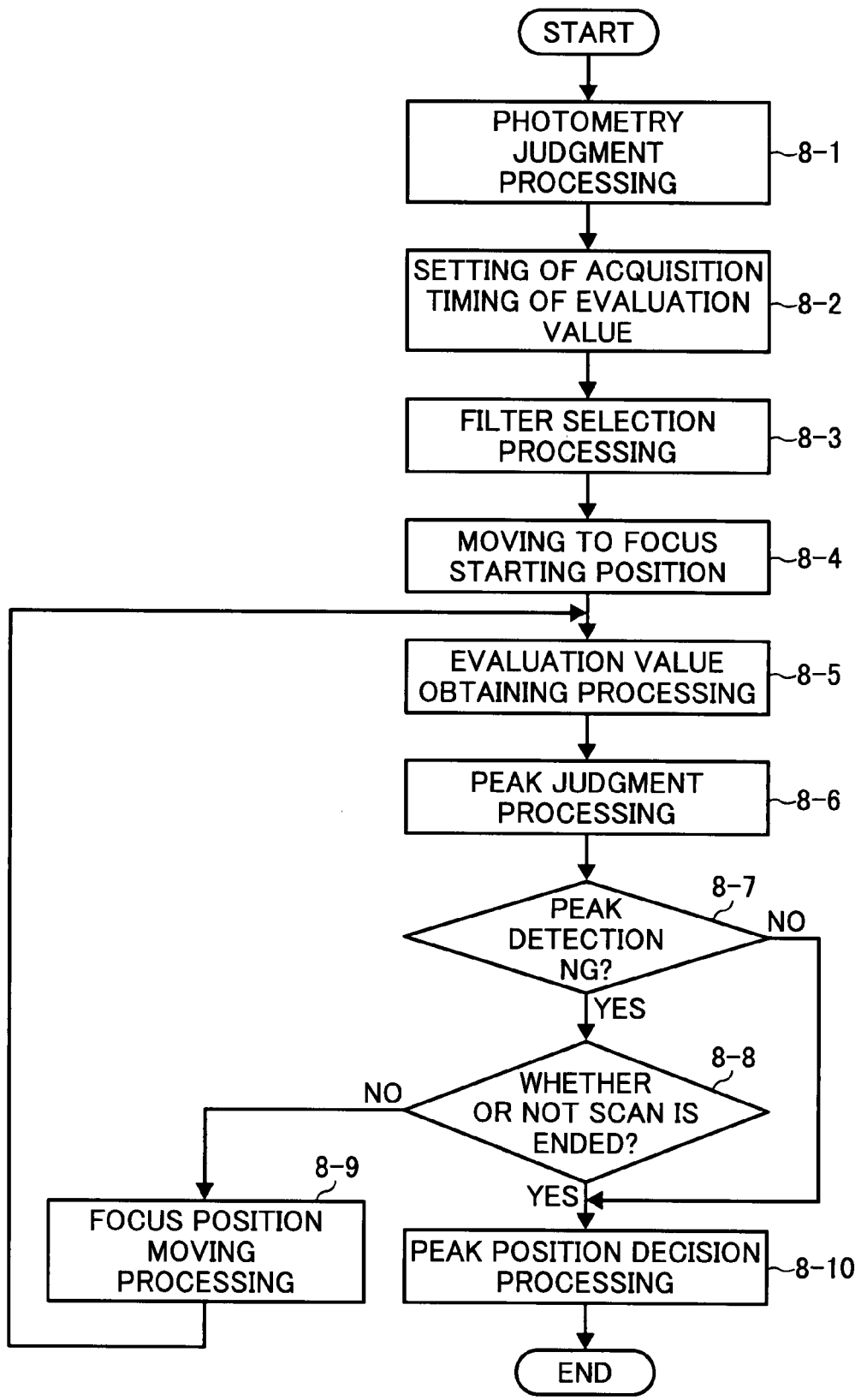
FIG. 8 illustrates an operation flowchart of a second embodiment according to the present invention.

FIG. 8 illustrates an operation flow chart of the second embodiment of the imaging device according to the present invention. The imaging device according to this embodiment, includes a filter selection device configured to select a filter transmitting an optional frequency component of the subject image; an autofocus detection device configured to detect a focus from an image data obtained by moving a focus lens to a lens position; an acquisition timing setting device configured to set a timing of capturing the image data; and a photometric device configured to measure a brightness of the subject, the imaging device being configured to use the acquisition timing setting device in accordance with a measured result obtained by the photometric device, and change the filter of the filter selection device in accordance with the acquisition timing set by the acquisition timing setting device.

First, the release shutter button SW1 illustrated in FIG. 1 is operated, and a brightness of a subject is judged (8-1), based on the measured result obtained immediately before the release shutter button is pressed.

It is possible to measure the brightness of the subject from output of the CCD 101. A setting of an acquisition timing of an AF evaluation value is decided in accordance with a brightness (LV value) obtained from the measured result (8-2).

Figure 9:
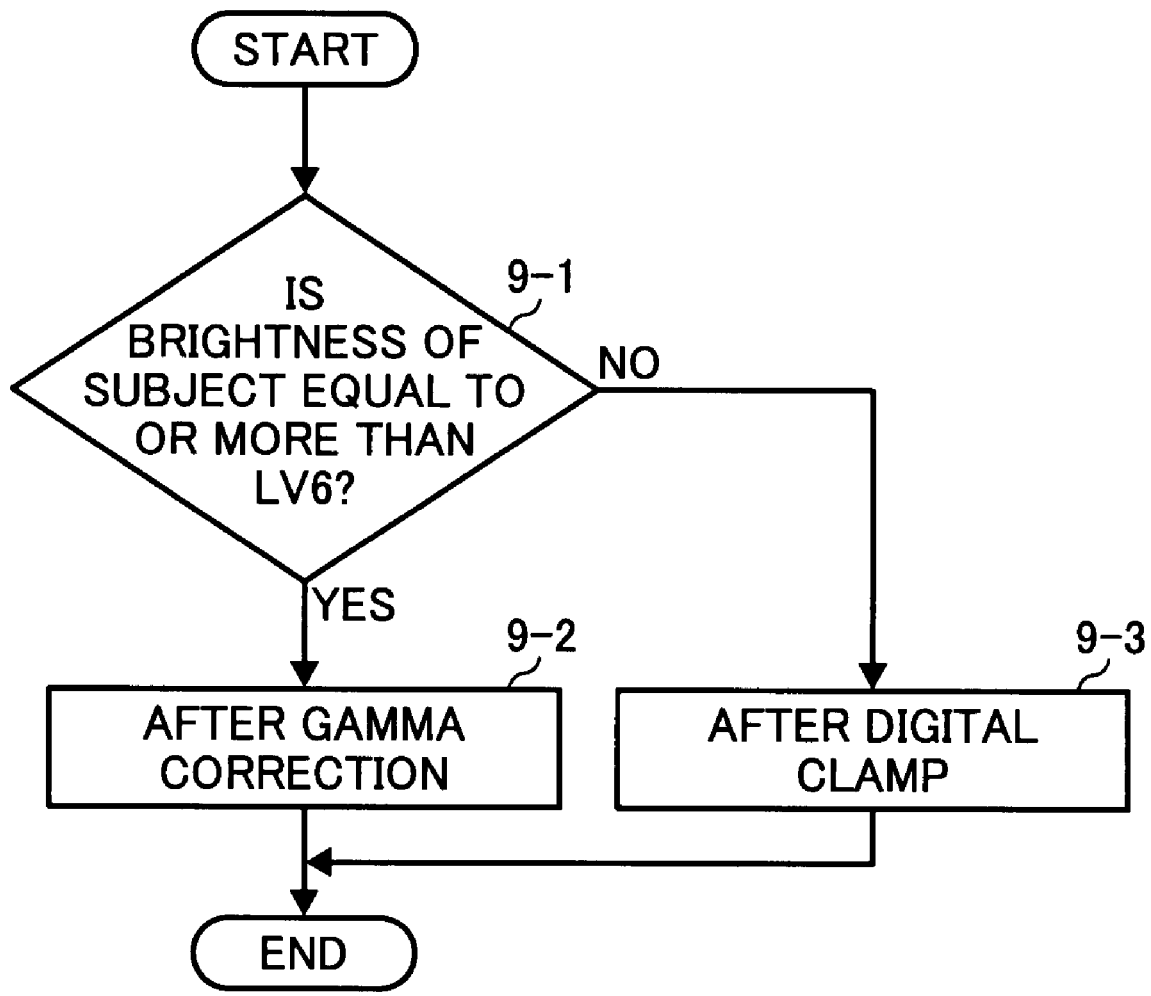
FIG. 9 illustrates a flowchart of an acquisition timing setting process of an evaluated value by brightness.

FIG. 9 illustrates a setting processing of the acquisition timing of the evaluation value.

When the brightness of the subject is equal to or more than LV6 (9-1), the acquisition timing of the evaluation value is decided to be after gamma correction (9-2), and then the process advances to the following processing.

When the brightness of the subject is less than LV6, the acquisition timing of the evaluation value is decided to be after digital clamp (9-3), and then the process advances to the following processing.

In this way, it is possible to prevent black stretch from occurring in the subject in the case of dark when the brightness of the subject is less than LV6.

The threshold (LV value) of the above-mentioned brightness set in each judgment step is limited for the second embodiment, and generally, it is suitably changeable according to an aperture value of a lens (F value), the performance of the CCD101, etc.

Subsequently, the filter selection processing illustrated in FIG. 8 is carried out (8-3).

FIG. 7 illustrates the flow chart of this processing.

When the acquisition timing of the AF evaluation value is after gamma correction, which is the default (7-1), for the filter, the first filter 41 for high frequency is selected (7-2). When the acquisition timing of the evaluation value is after digital clamp, for the filter, the third filter 43, which multiplies the first filter 41 for high frequency and the second filter 42 for low frequency, is selected (7-3).

In this way, in particularly in the case of low brightness when the acquisition timing is after digital clamp, the filter is selected to be the one for low frequency, so that it is possible to improve AF accuracy.

Next, as illustrated in FIG. 8, the focus lens (7-2a) is moved to the focus starting position (8-4), and the AF evaluation value is obtained (8-5).

After obtaining the AF evaluation value, detection of whether the evaluation value is a peak or not, i.e. "Peak detection NG?" (8-7) is judged by a peak judgment processing (8-6).

When the peak is detected, the process is moved to a peak position decision processing (8-10). When the peak is not detected, the process is advanced to a judgment step (8-7) in which whether or not a scan is ended before the final end of the focus position is judged, and if the scan is not ended, the scan is continued to the focus position sequentially (8-9), the process returns to the evaluation value acquiring processing step (8-5), and similar processing is carried out repeatedly.

When the scan ends, the process moves to the peak position decision processing (8-10).

Next, a peak position with more reliability is decided from the scanned AF evaluation value, then the focus lens is moved to the decided peak position, and the operation is ended.

In addition, when a peak position with reliability is not found, as AF scan NG, the focus lens is moved to a predetermined focus position, for example, a focus position corresponding to about 2.5 m, and the operation is ended (8-10).

Moreover, in the above-mentioned embodiment, the filter for high frequency, the filter for low frequency and the filter multiplying the two filters, which are simple filters of three coefficients are used, if filters of five or seven coefficients are permissible by the microcomputer (CPU block 104-3), it is desirable to use them.

In addition, in the above-mentioned second embodiment, since the filter is changeable in accordance with the capturing timing of the evaluation value, it is further preferable that the filter be changeable in accordance with the brightness and the subject separately.

Moreover, considering that an output of a top of the peak of the AF evaluation value is different due to the setting status of the acquisition timing of the evaluation value and the method of the filter selection, it is desirable that the threshold or the like used for the peak judgment during the peak judgment processing be changeable in accordance with the state of the image data output.

As illustrated in the above-mentioned first and second embodiments, in order to correspond to various brightnesses of the subject, when the brightness is low, or when a dark subject as in the dark photographing mode is photographed, by making corrections by setting the acquisition timing of the evaluation value to be after digital clamp, and by selecting the filter relative to the output at that time, it is possible to correspond to subjects with various brightnesses.

According to the present invention, it is possible to perform the AF function in a wide brightness range from a high brightness to a low brightness.

It should be noted that although the present invention has been described with respect to exemplary embodiments, the invention is not limited thereto. In view of the foregoing, it is intended that the present invention cover modifications and variations provided they fall within the scope of the following claims and their equivalent.

The entire contents of Japanese patent application No. JP 2006-176640, filed on Jun. 27, 2006, of which the convention priority is claimed in this application, are incorporated hereinto by reference.

What is claimed is:

1. An imaging device, including an imaging element which takes a subject image by light from a subject passing through a photographing lens and obtains an image data, comprising:
   an acquisition timing setting device configured to set a timing of acquiring an autofocus evaluation value from the image data;
   a filter selection device configured to select a filter transmitting an optional frequency component of the image data, said filter being used for calculating the autofocus evaluation value from the image data; and
   an autofocus detection device configured to detect a focus based on the autofocus evaluation value calculated from the image data obtained by moving a focus lens to a lens position,
   wherein the acquisition timing setting device sets the timing of acquiring the autofocus evaluation value in accordance with a photographing condition, and
   the filter selection device selects the filter in accordance with the photographing condition.

2. An imaging device according to claim 1, wherein the imaging device further includes a detection result judgment device configured to judge whether a focus detection is possible or not according to a detection result by the autofocus detection device; and an acquisition timing setting device capable of setting an acquisition timing of an autofocus evaluation value from the image data,
   wherein the acquisition timing setting device sets the timing of acquiring the autofocus evaluation value in accordance with the photographing condition, and a threshold of the detection result judgment device is changed in accordance with a setting status of the acquisition timing setting device.

3. An imaging device according to claim 1, wherein as the acquisition timing set by the acquisition timing setting device, at least either after digital clamp or after gamma correction is selectable.

4. An imaging device according to claim 3, wherein when the after digital clamp is set by the acquisition timing setting device, the filter of the filter selection device is changed to a filter only transmitting low frequency.

5. An imaging device according to claim 3, wherein when the after gamma correction is set by the acquisition timing setting device, the filter of the filter selection device is changed to a filter transmitting high frequency.

6. An imaging device according to claim 2, wherein as the acquisition timing set by the acquisition timing setting device, at least either after digital clamp or after gamma correction is selectable, and
   wherein when the after digital clamp is set by the acquisition timing setting device, the threshold of the detection result judgment device is reduced.

7. An imaging device according to claim 2, wherein as the acquisition timing set by the acquisition timing setting device, at least either after digital clamp or after gamma correction is selectable, and
   wherein when the after gamma correction is set by the acquisition timing setting device, the threshold of the detection result judgment device is increased.

8. An imaging device, including an imaging element which takes a subject image by light from a subject passing through a photographing lens and obtains an image data, comprising:
   an acquisition timing setting device configured to set a timing of acquiring an autofocus evaluation value from the image data;
   a filter selection device configured to select a filter transmitting an optional frequency component of the image data, said filter being used for calculating the autofocus evaluation value from the image data;
   an autofocus detection device configured to detect a focus based on the autofocus evaluation value calculated from the image data obtained by moving a focus lens to a lens position; and
   a photometric device configured to measure a brightness of the subject, wherein the acquisition timing setting device sets the timing of acquiring the autofocus evaluation value in accordance with a measured result obtained by the photometric device, and the filter selection device selects the filter in accordance with the measured result obtained by the photometric device.

9. An imaging method, in which an imaging element takes a subject image by light from a subject passing through a photographing lens and obtains an image data, comprising:

an acquisition timing setting step for setting a timing of acquiring an autofocus evaluation value from the image data;

a filter selection step for selecting a filter transmitting an optional frequency component of the image data; and an autofocus detection step for detecting a focus based on the autofocus evaluation value calculated from the image data obtained by moving a focus lens to a lens position, wherein in the acquisition timing setting step the timing of acquiring the autofocus evaluation value is set in accordance with a photographing condition, and in the filter selection step the filter is selected in accordance with the photographing condition.

10. An imaging method according to claim 9, the imaging method further comprising a detection result judgment step for judging whether a focus detection is possible or not according to a detection result by the autofocus detection step; and an acquisition timing setting step capable of setting an acquisition timing of an autofocus evaluation value from the image data, wherein in the acquisition timing setting step the timing of acquiring the autofocus evaluation value is set in accordance with the photographing condition, and a threshold of the detection result judgment step is changed in accordance with a setting status of the acquisition timing setting step.

11. An imaging method according to claim 9, the acquisition timing set by the acquisition timing setting step being selectable at least from either after digital clamp or after gamma correction.

12. An imaging method according to claim 11, wherein when the after digital clamp is set by the acquisition timing setting step, the filter of the filter selection step is changed to a filter only transmitting low frequency.

13. An imaging method according to claim 11, wherein when the after gamma correction is set by the acquisition timing setting step, the filter of the filter selection step is changed to a filter transmitting high frequency.

14. An imaging method according to claim 10, wherein the acquisition timing set by the acquisition timing setting step is selectable at least from either after digital clamp or after gamma correction, and wherein when the after digital clamp is set by the acquisition timing setting step, the threshold of the detection result judgment step is reduced.

15. An imaging method according to claim 10, wherein the acquisition timing set by the acquisition timing setting step is selectable at least from either after digital clamp or after gamma correction, and wherein when the after gamma correction is set by the acquisition timing setting step, the threshold of the detection result judgment step is increased.

16. An imaging method, in which an imaging element takes a subject image by light from a subject passing through a photographing lens and obtains an image data, comprising:

an acquisition timing setting step capable of setting a timing of acquiring an autofocus evaluation value from the image data;

a filter selection step for selecting a filter transmitting an optional frequency component of the image data;

an autofocus detection step for detecting a focus based on the autofocus evaluation value calculated from the image data obtained by moving a focus lens to a lens position; and a photometric step for measuring a brightness of the subject, wherein in the acquisition timing setting step the timing of acquiring the autofocus evaluation value is set in accordance with a measured result obtained by the photometric step, and in the filter selection step the filter is selected in accordance with the measured result obtained by the photometric step.

* * * * *